(12) United States Patent
Morel (10) Patent No.: US 10,392,088 B2
(45) Date of Patent: Aug. 27, 2019

(54) WING FOR THE PROPULSION OF A VEHICLE

(71) Applicant: Julien Morel, Paris (FR)

(72) Inventor: Julien Morel, Paris (FR)

(73) Assignee: CWS MOREL, Paris (FR)

( * ) Notice: Subject to any disclaimer, the term of this patent is extended or adjusted under 35 U.S.C. 154(b) by 389 days.

(21) Appl. No.: 15/319,297

(22) PCT Filed: Jun. 17, 2015

(86) PCT No.: PCT/FR2015/051610
§ 371 (c)(1),
(2) Date: Dec. 15, 2016

(87) PCT Pub. No.: WO2015/193617
PCT Pub. Date: Dec. 23, 2015

(65) Prior Publication Data
US 2017/0113769 A1    Apr. 27, 2017

(30) Foreign Application Priority Data

Jun. 18, 2014  (FR) ...................... 14 55580

(51) Int. Cl.
*B63H 9/06*   (2006.01)
*B64C 3/52*   (2006.01)

(52) U.S. Cl.
CPC ......... *B63H 9/0607* (2013.01); *B63H 9/0657* (2013.01); *B64C 3/52* (2013.01); *B63H 2009/0635* (2013.01)

(58) Field of Classification Search
CPC .... B64C 3/44; B64C 3/48; B64C 3/52; B63H 9/04; B63H 9/06; B63H 9/0607; B63H 9/0657; B63H 9/08; B63H 9/10; B63H 2009/0664
See application file for complete search history.

(56) References Cited

U.S. PATENT DOCUMENTS

| | | |
|---|---|---|
| 3,332,383 A | 7/1967 | Wright |
| 4,341,176 A | 7/1982 | Orrison |
| 4,386,574 A | 6/1983 | Riolland |
| 4,624,203 A | 11/1986 | Ferguson |
| 4,895,091 A | 1/1990 | Elmali et al. |

(Continued)

FOREIGN PATENT DOCUMENTS

| | | |
|---|---|---|
| DE | 42 07 539 A1 | 9/1993 |
| FR | 2 676 032 A1 | 11/1992 |

(Continued)

*Primary Examiner* — Nicholas McFall
(74) *Attorney, Agent, or Firm* — Im IP Law; C. Andrew Im; Chai Im (57) ABSTRACT

A wing for the propulsion of a craft includes an external envelope and at least one profile structure surrounded by the external envelope. The profile structure has an articulated internal structure and an assembly of controllers to control a deformation of the external envelope. Each controller is rotatably mounted with respect to the internal structure. Each controller is also rotatably mounted with respect to the external envelope through at least one rotating link, and includes at least one curved surface configured to orient a curvature of the external envelope locally between a controller and an adjacent control controller.

15 Claims, 4 Drawing Sheets

(56) References Cited

U.S. PATENT DOCUMENTS

| | | | |
|---|---|---|---|
| 5,181,678 A | | 1/1993 | Widnall et al. |
| 5,603,276 A | * | 2/1997 | Julien .................. B63H 9/06 114/39.21 |
| 6,045,096 A | | 4/2000 | Rinn et al. |
| 6,863,008 B2 | | 3/2005 | Gonen |
| 7,384,016 B2 | | 6/2008 | Kota et al. |

FOREIGN PATENT DOCUMENTS

| | | |
|---|---|---|
| GB | 2 085 387 A | 4/1982 |
| WO | 86/00591 A1 | 1/1986 |

\* cited by examiner

WING FOR THE PROPULSION OF A VEHICLE

RELATED APPLICATIONS

This application is a § 371 application from PCT/FR2015/051610 filed Jun. 17, 2015, which claims priority from French Patent Application No. 14 55580 filed Jun. 18, 2014, each of which is incorporated herein by reference in its entirety.

TECHNICAL FIELD OF THE INVENTION

The present invention relates to a wing for the propulsion of a craft. The invention finds a particularly advantageous, but not exclusive, application for the propulsion of a boat.

BACKGROUND TECHNOLOGY

The reproduction of a wing having a profile structure with a high aerodynamic potential has been the subject of a great deal of research. As a wing for the propulsion of a craft is meant to be used whatever the direction of the apparent wind, the main challenge is to precisely reproduce profiles with a high aerodynamic potential in a symmetrical way.

Thus, systems have been developed which use flexible external envelopes, with or without extension. The external envelope is thus reproduced by means of one or more flexible elements, mostly in the form of battens, these battens being deformed by internal or external mechanisms.

Certain known devices, described in particular in documents U.S. Pat. No. 6,863,008 and WO8600591, use a symmetrical front element whose end corresponds to the leading edge of the profile, which in fact entails two limitations. On the one hand, the profile obtained then has an axis of symmetry on the leading edge and cannot reproduce with precision the known optimized profiles having a high curvature such as S1223 or FX74CL5 MOD which do not possess this symmetry. On the other hand, these systems can then reproduce, with an external envelope that is continuous and can be only very slightly extended, only profiles for which the differences in length between the intrados and the extrados are negligible, i.e. which have a low curvature and do not correspond to known optimized profiles such as S1223 or FX74CL5 MOD.

Other known devices, described in particular in documents U.S. Pat. No. 4,895,091 or 4,386,574, succeed in increasing the curvature of the assembly by separating the back of the envelope, thus creating a discontinuity of the external envelope at the rear part of the profile, which will weaken the whole device, limit the precision of the control of the rear shape of the profile and create aerodynamic perturbations at the rear part of the profile in comparison with known optimized profiles such as S1223 or FX74CL5 MOD.

The devices described in particular in documents U.S. Pat. No. 3,332,383 or 6,045,096 are able to cause a part of the external envelope to slide on a part of the internal structure, the shape of said internal structure being meant to reproduce the shape of an aerodynamic profile, generating thereby frictions which weaken the assembly and limit the control precision.

In addition, the devices described in particular in documents U.S. Pat. No. 4,624,203 or 4,341,176 use a mechanical internal structure in which some parts slide against each other in order to reproduce the shape of an aerodynamic profile, generating thereby frictions which weaken the assembly and limit the control precision.

The devices described in particular in documents U.S. Pat. No. 5,181,678 or 7,384,016 are based on the use of a flexible internal structure in order to reproduce the shape of an aerodynamic profile, resulting in an overall fragility of the internal structure and a limitation of the precision of the assembly.

Double-wheeled sail devices are also known, as described in GB2085387, which makes it possible to increase the length of one side of the envelope in order to create a difference in length between the extrados and the intrados while keeping the tail integral with the envelope. The system described in document DE4207539 uses an assembly composed of a symmetrical front part and two battens for forming a closed assembly having a difference in length between the extrados and the intrados.

However, the external envelope is not formed by a single flexible element, and this can weaken the device. Moreover, the symmetrical front part induces symmetry in the curvature, which does not make it possible to precisely reproduce the curvature variation of optimized profiles such as S1223 or FX74CL5MOD. The control structure is not defined on the whole profile and there is no additional control of the local curvature on the battens. It should also be noted that the intrados has no concavity and that the device uses a sliding connection between the structure connected to the mast and the battens, which creates frictions and weakens the assembly.

Thus, none of the known profile structures can reproduce with precision and robustness known optimized profiles such as S1223 or FX74CL5 MOD by optimally controlling a single flexible, continuous external element, which can be only very slightly extended. This explains in part why, in the present state of the art, competition yachts, such as AC72 or AC45, preferentially use an assembly of rigid symmetrical profiles hinged to one another, these various profiles acting directly as a skin external to the assembly. In this case, it is possible to reproduce high curvatures on the entire wing. However, the external shape then has curvature discontinuities, which increases the shape drag of the assembly.

OBJECT OF THE INVENTION

The invention is meant to effectively overcome the disadvantages of existing systems by proposing a wing for the propulsion of a craft, characterized in that it comprises an external envelope and at least one profile structure surrounded by said external envelope, said profile structure having an articulated internal structure and an assembly of control means for controlling a deformation of said external envelope, each control means being rotatably mounted with respect to said internal structure, each control means being also rotatably mounted with respect to said external envelope through at least one rotating link and including at least one curved surface configured to orient a curvature of said external envelope locally between said control means and an adjacent control means.

According to one embodiment, said profile structure is adapted to adopt a position, referred to as the neutral position, in which said profile structure has a longitudinal plane of symmetry.

According to one embodiment, said internal structure is articulated so as to be able to ensure a change in the curvature of said profile structure to pass from a first position to a second end position, and vice versa.

According to one embodiment, at least one control means
is rotatably mounted relative to a first side of said external
envelope through a first rotating link and includes a first
curved surface configured to orient the curvature of
said external envelope locally along said first side of
said external envelope when said profile structure is
located in said first end position, and
is rotatably mounted relative to a second side of said
external envelope opposite said first side through a
second rotating link and includes a second curved
surface configured to orient the curvature of said external envelope locally along said second side when said
profile structure is located in said first end position.

According to one embodiment, said control means
includes
a third curved surface substantially symmetrical to said
first curved surface, said third curved surface being
configured to orient the curvature of said external
envelope locally along said second side of said external
envelope when said profile structure is in said second
end position, and
a fourth curved surface substantially symmetrical to said
second curved surface, said fourth curved surface being
configured to orient the curvature of said external
envelope locally along said first side of said external
envelope when said profile structure is in said second
end position.

According to one embodiment, two parts of said external
envelope extending between one end of the profile structure
and each of the two rotating links of a given control means
have substantially identical lengths.

According to one embodiment, a control means located at
one end of said profile structure, referred to as a nose, is
rotatably mounted with respect to said external envelope
through a single rotating link and includes a single curved
surface for orienting the curvature of said external envelope
from said rotating link to a leading edge of said profile
structure.

According to one embodiment, said articulated internal
structure is composed of several elements articulated to one
another by rotating links.

According to one embodiment, said internal structure
comprises an element, referred to as a tail, which said
external envelope is fixed to, said tail being meant to orient
the curvature on the side of a rear end of said external
envelope.

According to one embodiment, said external envelope is
made of a flexible and substantially non-extensible material.

According to one embodiment, said wing comprises a
plurality of profile structures carried by at least one structural element such as a mast or spar.

According to one embodiment, said external envelope is
made in one piece between said profile structures.

According to one embodiment, said external envelope
comprises at least one portion made of a flexible material
and portions made of a rigid material around each profile
structure, said portion of flexible material extending
between at least two portions of rigid material, so that the
portion of flexible material can be folded.

According to one embodiment, said control means define
handles of a spline characterizing a desired envelope curvature.

According to one embodiment, said control means are
defined so as to allow said external envelope to reproduce
with the greatest possible precision the curvature of an
theoretical envelope such as FX74-CL5-MOD.

BRIEF DESCRIPTION OF THE FIGURES

The invention will be better understood on reading the
following description and on examining the accompanying
figures. These figures are given as an illustration only, and
by no means as a limitation, of the invention.

Identical, similar, or analog elements have the same
references throughout the figures.

DESCRIPTION OF EXAMPLARY
EMBODIMENTS OF THE INVENTION

Figure 1A:
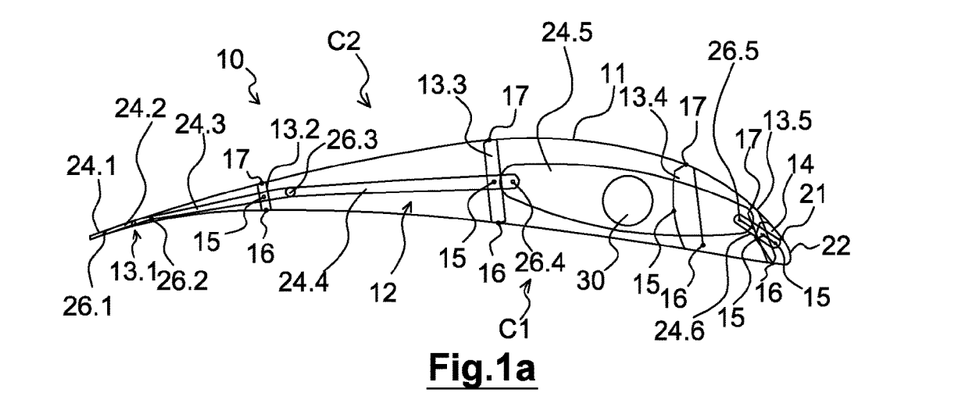
FIGS. 1a and 1b are cross-sectional views of a profile
structure according to the present invention when the latter
is in a first and a second end position.
Figure 1B:
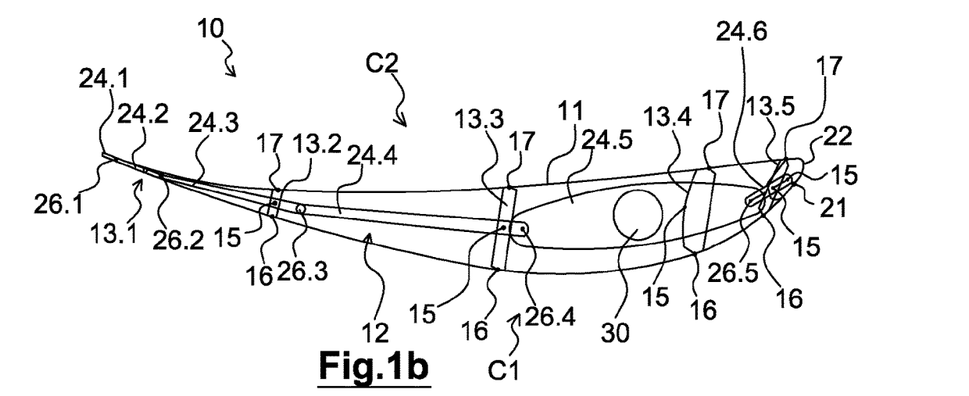

FIGS. 1a and 1b show cross-sectional views of a profile
structure 10 surrounded by an external envelope 11. This
external envelope 11 is preferably flexible and substantially
non-extensible.

This profile structure 10 comprises an articulated internal
structure 12, as well as an assembly of control means
13.1-13.5, 14 for controlling the deformation of the envelope 11. Each control means 13.1-13.5, 14 is rotatably
mounted with respect to said internal structure 12 along a
rotating link 15.

The internal structure 12 is articulated so as to be able to
ensure a change in the curvature of the profile structure 10
between a first position and a second end position in each of
which the profile structure 10 has an optimal curvature. As
it can be seen in FIGS. 1a and 1b, the shapes which the
profile structure has in these two end positions are substantially symmetrical with respect to one another. The profile
structure 10 can also be in an intermediate position, shown
in FIG. 2, in which the structure 10 has a longitudinal plane
of symmetry P. In addition to this general symmetry, this
figure also shows the symmetry about the plane P of each of
the parts making up the profile structure 10 and in particular
each control means, including the nose.

Each control means 13.1-13.5 has an orientation substantially transverse to the profile structure 10. As it can be seen more clearly in FIGS. 3a and 3b, each control means 13.1-13.5 is rotatably mounted with respect to a first side C1 of the envelope 11 through a first rotating link 16. Each control means 13.1-13.5 includes a first curved surface 18 configured to orient the curvature of the envelope 11 locally around the control means 13.1-13.5 along the first side C1 when the profile structure 10 is in the first end position. In FIG. 1a, the first side C1 of the envelope 11 corresponds to that from which the wind arrives and is referred to as "intrados".

Figure 3A:
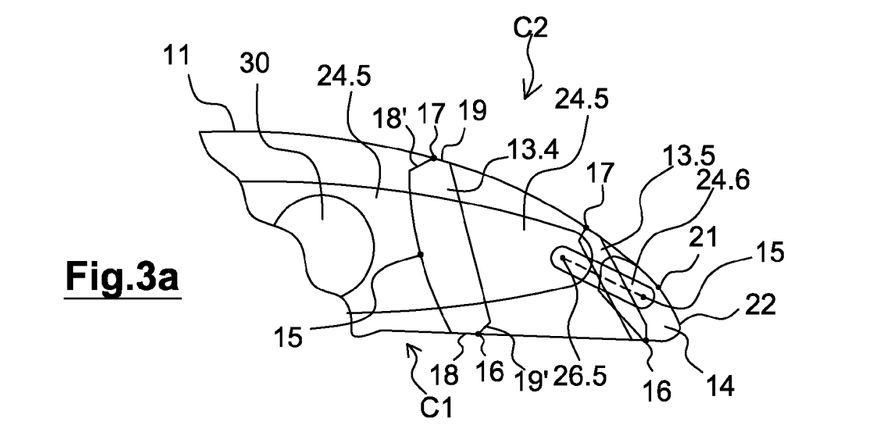
FIGS. 3a and 3b are detailed views of the front part of the
profile structure when the latter is respectively in the first
and second end positions.

Each control means 13.1-13.5 is also rotatably mounted with respect to a second side C2 of the envelope 11 opposite the first side C1 though a second rotating link 17. Each control means 13.1-13.5 also includes a second curved surface 19 configured to orient the curvature of the envelope 11 locally along the second side C2 when the profile structure 10 is in the first end position. In FIGS. 1a and 3a, the second side C2 of the envelope 11 opposite the first side is referred to as "extrados".

The two parts of the envelope 11 extending between one end of the profile structure 10 formed by the tail 24.1 (opposite the nose) and each of the two rotating links 16, 17 of a given control means 13.1-13.5 have substantially identical lengths. For example, as it is clear from FIG. 2, for the control means 13.2, the part of the envelope 11 which extends over the length L1 has the same length as the part which extends over the length L2. The same applies to control means 13.1, 13.3-13.5.

In addition, the rotating links 15, 16, 17 are in this case pivotal links about a substantially vertical axis perpendicular to the sheet on which the figures are represented.

Figure 3B:
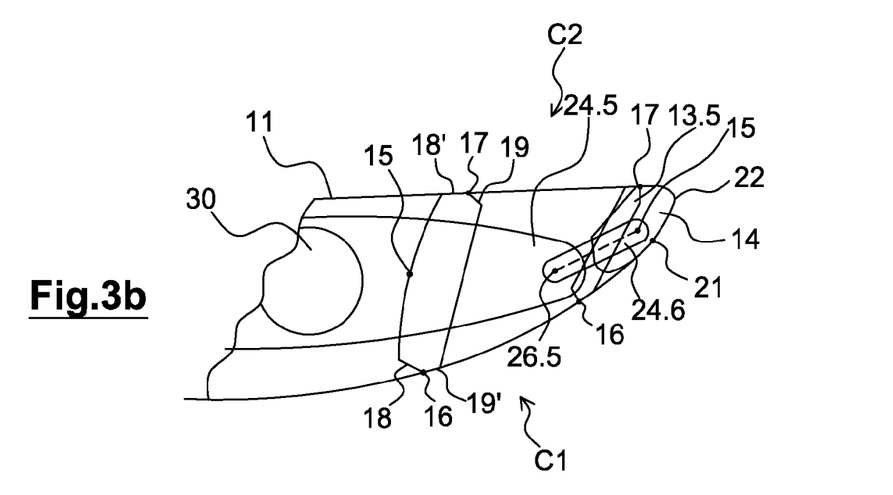

In addition, as it can be clearly seen in FIGS. 3a and 3b, each control means 13.1-13.5 includes a third curved surface 18' which is substantially symmetrical to the first curved surface 18 with respect to the substantially transverse median plane P of the control means 13.1-13.5. The third curved surface 18' is configured to locally orient the curvature of the envelope 11 locally along the second side C2 of the envelope 11 when the profile structure 10 is in the second end position. The second side C2 then corresponds to the intrados while the first side C1 corresponds to the extrados.

The control means 13.1-13.5 also includes a fourth curved surface 19' which is substantially symmetrical to the second surface 19 with respect to the substantially median and transverse plane P of the control means 13.1-13.5. The fourth curved surface 19' is configured to orient the curvature of the envelope 11 locally along the first side C1 of the envelope 11 when the profile structure 10 is located in the second end position.

On the side C1, the first 18 and the fourth 19' surfaces are positioned on either side of the rotating link 16. On the side C2, the second 19 and the third 18' surfaces are positioned on either side of the rotating link 17.

It should be noted that the curved surfaces 18, 18'; 19, 19' are specific to each of the control means 13.1-13.5. Thus, two successive control means 13.1-13.5 includes curved surfaces 18, 18', 19, 19' having different curvatures, insofar as these curved surfaces correspond to spline portions having different radii of curvature and the control means 13.1, 13.5 have different angles of inclination, as explained hereinafter.

In addition, the profile structure 10 comprises a control means 14 located at one of its ends, referred to as a nose, rotatably mounted with respect to the envelope 11 through a single rotating link 21. The link 21 is also a pivot type link.

The nose 14 includes a single curved surface 22 for orienting the curvature of the envelope 11 from said rotating link 21 to a leading edge of the profile structure 10.

Taking into account the pivot links 16, 17, 21 between the envelope 11 and each control means 13.1-13.5, 14, the envelope 11 and each control means are integral in translation with respect to one another, that is to say, if the envelope 11 moves in translation, it moves the control means in translation, and conversely when the control means moves in translation, it moves the envelope 11 in translation. In other words, in the invention, the envelope 11 cannot slide with respect to the control means 13.1-13.5, 14.

The control means 13.1-13.5, 14 thus define, in the two end positions, handles of a spline characterizing a curvature of the envelope 11 desired. Each handle is defined by the coordinates in the plane of the points of connection of these control means to the external envelope formed by the rotating links 16, 17, and locally the curvature of the envelope around these points of connection.

Indeed, for each handle, the curved surface or surfaces 18, 18', 19, 19', 22 of a given control means 13.1-13.5, 14 orient the curvature of the envelope 11 between said given control means 13.1-13.5, 14 and the following control means. In the two end positions of the profile structures, the control means 13.1-13.5, 14 make it possible in this case to reproduce as precisely as possible the intrados and the extrados of a theoretical envelope curvature of the type FX74-CL5-MOD. Other types of theoretical models may alternatively be reproduced.

The articulated internal structure 12, which has a longitudinal orientation with respect to the profile structure 10, is formed by several elements 24.1-24.6 hinged to one another through rotating links 26.1-26.5. The rotating links 26.1-26.5 are in this case pivotal links about a substantially vertical axis perpendicular to the sheet on which the figures are represented.

The elements 24.1-24.6 connect the different control means 13.1-13.5, 14. Indeed, each control means 13.1-13.5 is connected to one of the elements 24.1-24.6 through a rotating link 15. In the embodiment shown, the rotating links 26.1-26.5 are distinct from the rotating links 15. Alternatively, it will be possible that some or all of the links 26.1-26.5 are identical to the links 15.

Figure 4:
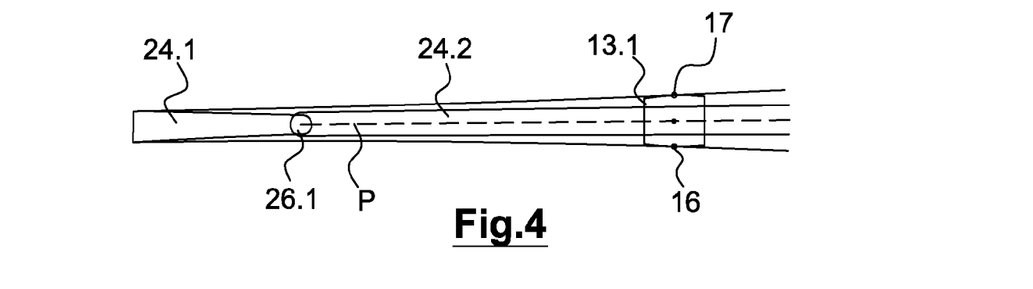
FIG. 4 is a detailed view of the rear part of the profile
structure according to the present invention.

As it can be clearly seen in FIG. 4, the internal structure 12 comprises, at the rear end of the profile, an element 24.1, referred to as a profile tail, which the envelope 11 is fixed to. The tail 24.1 orientates the curvature of the rear end of the envelope 11. With the exception of the tail 24.1, it is not necessary for the other elements of the internal structure 12 to participate in the orientation of the curvature of the external envelope 14. Indeed, in addition to the function of displacement, the internal structure 12 is meant to ensure a sufficient rigidity of the assembly. However, in certain embodiments, it will be possible to use elements of the internal structure 12, other than the tail 24.1, locally as support surface for the external envelope 11.

The operation of the profile structure 10 is described below. In the first end position shown in FIGS. 1a and 3a, the first curved surface 18 and the second curved surface 19 of the different control means 13.1-13.5 cooperate respectively with the intrados and the extrados of the envelope 11. The third curved surface 18' and the fourth curved surface 19' are then not in contact with the envelope 11. The nose 14 also cooperates with the front part to obtain the desired optimal curvature. The nose 14 cooperates from the point 21 to the leading edge of the profile corresponding to the end of the structure 10.

Thus, on the intrados side (in this case the side C1), the tail 24.1 orientates the curvature of the envelope 11 up to the control means 13.1. The first curved surface 18 of the control means 13.1 orients the curvature of the envelope 11 up to the control means 13.2. The first curved surface 18 of the control means 13.2 orients the curvature of the envelope 11 up to the control means 13.3. The first curved surface 18 of the control means 13.3 orients the curvature of the envelope 11 up to the control means 13.4. The first curved surface 18 of the control means 13.4 orients the curvature of the envelope 11 up to the control means 13.5. The first curved surface 18 of the control means 13.5 orients the curvature of the envelope 11 up to the nose 14, which orientates the curvature Of the envelope 11 on the leading edge up to the point 21 on the side C2 (extrados).

Moreover, on the extrados side (in this case the side C2), the tail 24.1 orients the curvature of the envelope 11 up to the control means 13.1. The second curved surface 19 of the control means 13.1 orients the curvature of the envelope 11 up to the control means 13.2. The second curved surface 19 of the control means 13.2 orients the curvature of the envelope 11 up to the control means 13.3. The second curved surface 19 of the control means 13.3 orients the curvature of the envelope 11 up to the control means 13.4. The second curved surface 19 of the control means 13.4 orients the curvature of the envelope 11 up to the control means 13.5. The second curved surface 19 of the control means 13.5 orients the curvature of the envelope 11 up to the nose 14. The nose 14 also orients the curvature of the envelope 11 from the point 21 up to the leading edge.

Figure 2:
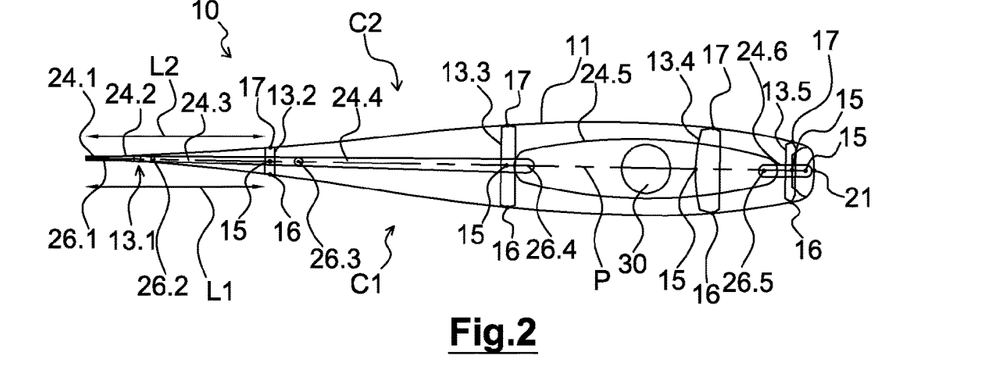
FIG. 2 shows a sectional view of the profile structure
according to the present invention without the internal
structure when it is located in an intermediate position.

After rotating the elements 24.1-24.6 of the internal structure 12 with respect to each other, the curvature of the structure 12 decreases until the profile structure 10 passes through a transition position shown in FIG. 2, in which said profile structure 10 has a symmetrical shape. This representation shows that the lengths of the parts of the envelope 11 extending from the tail 24.1 to opposite links of the same control means 13.1-13.5 have substantially identical lengths.

The subsequent rotational movement of the elements 24.1-24.6 of the internal structure 12 then has the effect of increasing the curvature of the internal structure 12 up to the second end position visible in FIGS. 1b and 3b, so that the intrados and the extrados are interchanged. The third curved surface 18' and the fourth curved surface 19' of the control means 13 then cooperate with the intrados and the extrados of the new shape of the profile structure 10. The first 18 and the second 19 curved surfaces are no longer in contact with the envelope 11. The nose 14 is then in a position symmetrical to that in the first end position.

Thus, on the intrados side (in this case the side C2), the tail 24.1 orients the curvature of the envelope 11 up to the control means 13.1. The third curved surface 18' of the control means 13.1 orients the curvature of the envelope 11 up to the control means 13.2. The third curved surface 18' of the control means 13.2 orients the curvature of the envelope 11 up to the control means 13.3. The third curved surface 18' of the control means 13.3 orients the curvature of the envelope 11 up to the control means 13.4. The third curved surface 18' of the control means 13.4 orients the curvature of the envelope 11 up to the control means 13.5. The third curved surface 18' of the control means 13.5 orients the curvature of the envelope 11 up to the nose 14, which orients the curvature Of the envelope 11 on the leading edge up to the point 21 on the extrados side (in this case the side C1).

Furthermore, on the extrados side (in this case the side C1), the tail 24.1 orients the curvature of the envelope 11 up to the control means 13.1. The fourth curved surface 19' of the control means 13.1 orients the curvature of the envelope 11 up to the control means 13.2. The fourth curved surface 19' of the control means 13.2 orients the curvature of the envelope 11 up to the control means 13.3. The fourth curved surface 19' of the control means 13.3 orients the curvature of the envelope 11 up to the control means 13.4. The fourth curved surface 19' of the control means 13.4 orients the curvature of the envelope 11 up to the control means 13.5. The fourth curved surface 19' of the control means 13.5 orients the curvature of the envelope 11 up to the nose 14 which orients the curvature on the leading edge of the profile structure 10.

Due to the symmetry of the profile structure 10 which is observable in the intermediate position, the optimum curvature desired will be obtained in the two end positions. In these two positions, the optimum curvature is obtained by a succession of local adaptations of the curvature of the envelope 11. It is noted in this respect that the profile structure 10 is meant to be used selectively in one of the two end positions, and not in intermediate positions between these two positions.

Preferably, stops are used to limit the displacements of the control means 13, 14 and of the internal structure 12 between the two end positions in which the wing has a shape corresponding to the desired profile.

Figure 5A:
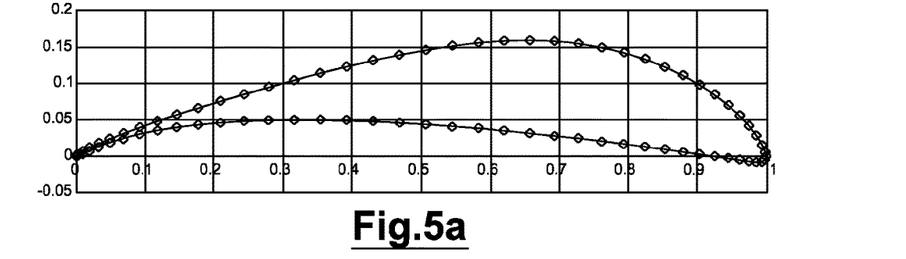
FIGS. 5a and 5b show respectively the curvature of the
theoretical profile structure such as FX-74-CL5 MOD and
the curvature of the profile structure according to the present
invention.

FIG. 5a shows the theoretical profile FX-74-CL5 MOD with the points as defined by Dr. Franz Xaver Wortmann.

Figure 5B:
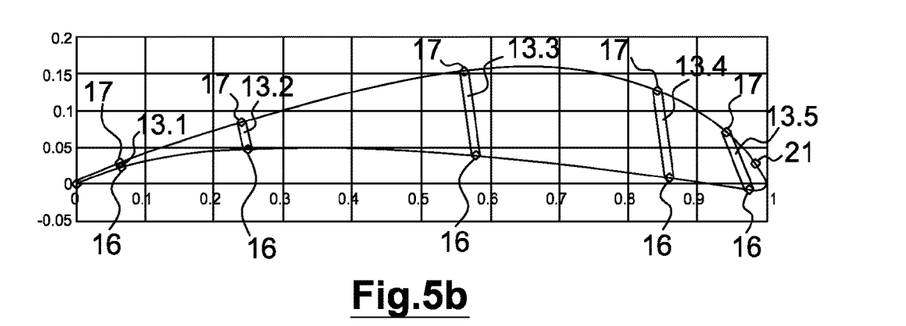

FIG. 5b shows the pairs of rotating link 16-17 as well as the rotating link 21 in an end position as well as the spline obtained from these points. It should be noted that the pairs of points 16-17 are equidistant from the rear end of the profile or point 21.

Figure 5C:
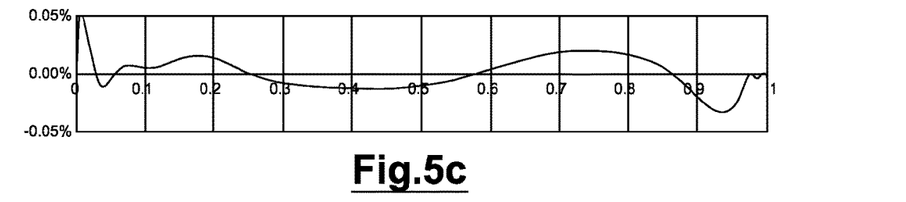
FIG. 5c represents the error expressed as a percentage of
the length of the chord of the theoretical profile between the
spline of the profile structure according to the present
invention and the intrados of the theoretical profile FX-74-CL5 MOD.
Figure 5D:
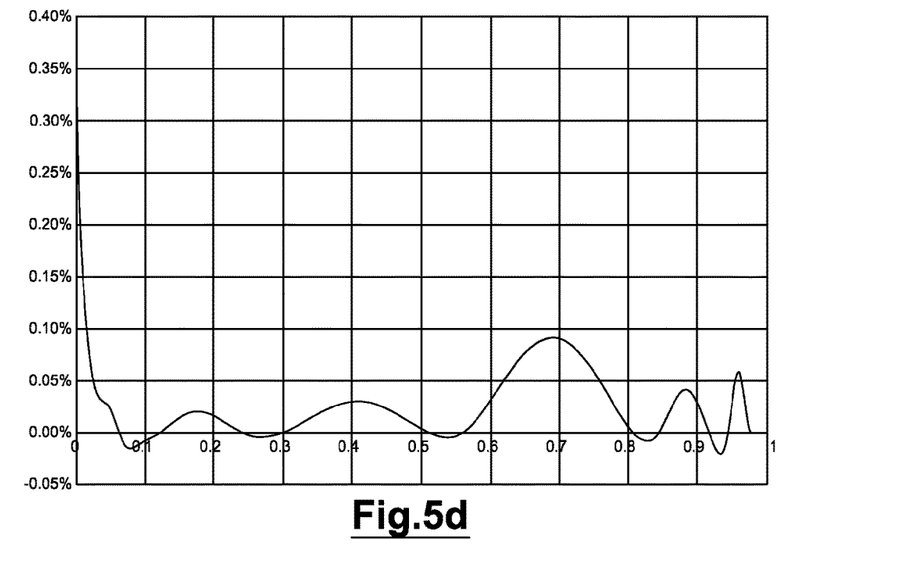
FIG. 5d shows the error expressed as a percentage of the
length of the chord of the theoretical profile between the
spline of the profile structure according to the present
invention and the extrados of the theoretical profile FX-74-CL5 MOD.

FIG. 5c shows the error expressed as a percentage of the length of the chord of the theoretical profile between the spline obtained from the links 16, 17, 21 and the intrados of the theoretical profile FX-74-CL5 MOD. FIG. 5d shows the error expressed as a percentage of the length of the chord of the theoretical profile between the spline obtained from the links 16, 17, 21 and the extrados of the theoretical profile FX-74-CL5 MOD. These figures show that the error is very small and, nearly at any point, except on the side of the rear end, inferior to 0.10%.

The exemplary embodiment has been given for a profile structure 10 comprising an articulated structure 12 formed of six elements 24.1-24.6 as well as five intermediate control means 13.1-13.5, plus the nose 14. However, it is clear that the number of intermediate control means and elements forming the internal structure 12 can vary, in particular according to the dimensions of the profile structure 10 and of the desired precision in the reproduction of a desired theoretical curvature.

Figure 6:
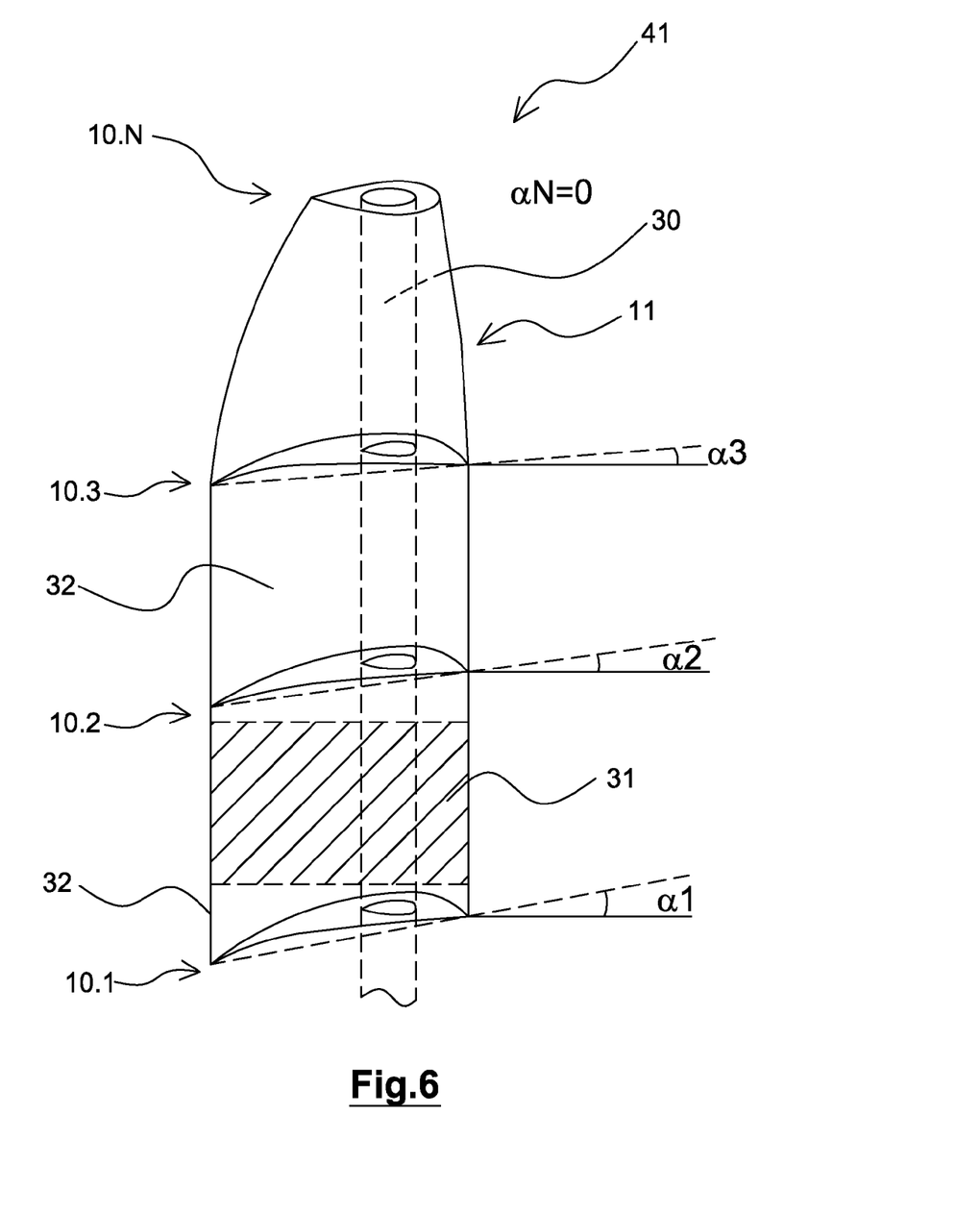
FIG. 6 is a perspective view of a wing comprising an
assembly of profile structures according to the present
invention.

The profile structure 10 previously described can be integrated into a wing 41 illustrated in FIG. 6. This wing 41 comprises in this instance a plurality of profile structures 10.1-10.N carried by at least one structural element 30 such as a mast for a boat or such as a spar for an airplane.

Preferably, the angle of attack a of these different profile structures 10.1-10.N, corresponding to the angle between the chord of the profile with respect to the direction of the wind, tends to decrease when moving from the bottom towards the top of the mast 30.

The curvature of the different profile structures 10.1-10.N can also vary accordingly. This allows to twister the profile, to limit the induced drag, and to lower the center of thrust of the boat.

According to a first embodiment, the envelope 11 is made in one piece between the profile structures 10.1-10.N. In this case, the envelope 11 can be made, for example, of a fiber-stiffened composite material.

According to a second embodiment, the envelope 11 comprises at least one portion 31 made of a flexible material and portions 32 made of a rigid material around each profile structure 10.1-10.N. The portion 31 of flexible material extends between at least two portions 32 of rigid material so that the portion 31 of flexible material can be bent by moving in translation, along the mast 30, the profile structures between which the portion of flexible material extends, such as the structures 10.1 and 10.2 in FIG. 4. Alternatively, the structures 10.1-10.N could be fixed, as for the old sailing ships with square sails.

As it is apparent from the description, the envelope 11 is fixed relative to the profile of structure 10. In any event, the envelope 11 is thus fixed to the profile structure 10 in at least four zones, namely the nose 14, the tail 24.1 and at the two rotating links 16, 17 of at least one control means.

Alternatively, the rotating links 15, 16, 17, 21, 26.1-26.5 could each have more than one axis of rotation.

Of course, the above description has been given as an example only and does not limit the scope of the invention which one will not go beyond when replacing the details of execution by any other equivalents.

The invention claimed is:

1. A wing for the propulsion of a craft, comprising:
an external envelope; and
at least one profile structure surrounded by the external envelope, the profile structure comprising:
an articulated internal structure having a longitudinal orientation relative to the profile structure and composed of a plurality of elements articulated to one another through rotating links;
an assembly of controllers to control a deformation of the external envelope, each controller is rotatably mounted with respect to the internal structure and is rotatably mounted with respect to the external envelope through at least one rotating link, movements of the external envelope and each controller are linked to each other such that the external envelope cannot move independent of said each controller; and
wherein each controller comprises at least one curved surface configured to orient a curvature of the external envelope locally between said each controller and an adjacent controller.

2. The wing according to claim 1, wherein the profile structure is configured to be in a neutral position, in which the profile structure has a longitudinal plane of symmetry.

3. The wing according to claim 1, wherein the internal structure is articulated to ensure a change in a curvature of the profile structure to move from a first end position to a second end position, and from the second end position to the first end position.

4. The wing according to claim 3, wherein at least one controller is rotatably mounted relative to a first side of the external envelope through a first rotating link, and said at least one controller comprises a first curved surface configured to orient the curvature of the external envelope locally along the first side of the external envelope in the first end position of the profile structure; and wherein said at least one controller is rotatably mounted relative to a second side, opposite the first side, of the external envelope through a second rotating link, and said at least one cone controller comprises a second curved surface configured to orient the curvature of the external envelope locally along the second side in the first end position of the profile structure.

5. The wing according to claim 4, wherein said at least one controller further comprises:
a third curved surface substantially symmetrical to the first curved surface, the third curved surface is configured to orient the curvature of the external envelope locally along the second side of the external envelope in the second end position of the profile structure; and
a fourth curved surface substantially symmetrical to the second curved surface, the fourth curved surface is configured to orient the curvature of the external envelope locally along the first side of the external envelope in the second end position of the profile structure.

6. The wing according to claim 4, wherein the external envelope comprises two parts of said external envelope, the two parts extend between one end of the profile structure and each of the two rotating links of said at least one controller, and two parts have substantially identical lengths.

7. The wing according to claim 1, wherein the articulated internal structure comprises a tail to which the external envelope is fixed to, the tail orients the curvature of a side of one rear end of the external envelope.

8. The wing according to claim 1, wherein the external envelope is made of a flexible and substantially non-extensible material.

9. The wing according to claim 1, further comprising a plurality of profile structures carried by at least one structural element.

10. The wing according to claim 9, wherein said at least one structural element is a mast or a spar.

11. The wing according to claim 10, wherein the external envelope is formed in one piece from said plurality of profile structures.

12. The wing according to claim 9, wherein the external envelope further comprises at least one portion made of a flexible material and other portions made of a rigid material around each profile structure, said at least one portion of flexible material is foldable by extending said at least one portion of flexible material between at least two portions of rigid material.

13. The wing according to claim 1, wherein the controllers define handles of a spline characterizing a predetermined envelope curvature.

14. The wing according to claim 1, wherein the controllers are defined to configure the external envelope to substantially reproduce an optimized curvature of FX74-CL5 Mod of a theoretical envelope.

15. A wing for the propulsion of a craft, comprising:
an external envelope; and
at least one profile structure surrounded by the external envelope, the profile structure comprising:
an articulated internal structure having a longitudinal orientation relative to the profile structure and composed of a plurality of elements articulated to one another through rotating links;
an assembly of controllers to control a deformation of the external envelope, each controller is rotatably mounted with respect to the internal structure and is rotatably mounted with respect to the external envelope through at least one rotating link, movements of the external envelope and each controller are linked to each other such that the external envelope cannot move independent of said each controller;
wherein each controller comprises at least one curved surface configured to orient a curvature of the external envelope locally between said each controller and an adjacent controller;

wherein one end of the profile structure is referred to as a nose; and wherein a controller at the nose is rotatably mounted with respect to the external envelope through a single rotating link and the controller comprises a single curved surface to orient the curvature of the external envelope from the single rotating link up to a leading edge of the profile structure.

\* \* \* \* \*